US009464606B2

(12) United States Patent
Friedrich et al.

(10) Patent No.: US 9,464,606 B2
(45) Date of Patent: Oct. 11, 2016

(54) HANDHELD WORK APPARATUS AND ELASTIC CONNECTING PIECE FOR A HANDHELD WORK APPARATUS

(71) Applicant: Andreas Stihl AG & Co. KG, Waiblingen (DE)

(72) Inventors: Sebastian Friedrich, Korb (DE); Jens Knauss, Remshalden (DE); Christian Schmidt, Schwaikheim (DE); Daniel Diepolder, Waiblingen (DE); Christina Escher, Winnenden (DE); Andreas Lingen, Althuette (DE); Juergen Bernert, Urbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 80 days.

(21) Appl. No.: 14/444,931

(22) Filed: Jul. 28, 2014

(65) Prior Publication Data

US 2015/0027396 A1 Jan. 29, 2015

(30) Foreign Application Priority Data

Jul. 27, 2013 (DE) .......................... 10 2013 012 510

(51) Int. Cl.
*F02B 75/02* (2006.01)
*F02M 35/10* (2006.01)
*F16L 27/108* (2006.01)

(52) U.S. Cl.
CPC ... *F02M 35/10144* (2013.01); *F02M 35/1017* (2013.01); *F02M 35/1019* (2013.01); *F02M 35/10137* (2013.01); *F02M 35/10196* (2013.01); *F02M 35/10281* (2013.01); *F02M 35/10301* (2013.01); *F02M 35/10321* (2013.01); *F02M 35/10354* (2013.01); *F16L 27/108* (2013.01)

(58) Field of Classification Search
CPC ................. F02M 35/10144; F02M 35/10137; F02M 35/1017; F02M 35/10354; F02M 35/1019; F02M 35/10196; F02M 35/10281; F02M 35/10301; F02M 35/10321; F16L 27/108
USPC ..................................................... 123/184.21
See application file for complete search history.

(56) References Cited

U.S. PATENT DOCUMENTS

| | | | | |
|---|---|---|---|---|
| 4,711,225 | A * | 12/1987 | Holderle et al. .............. 123/590 |
| 5,474,039 | A * | 12/1995 | Doragrip .................. 123/184.55 |
| 5,560,345 | A * | 10/1996 | Geyer et al. .................. 123/516 |
| 5,595,153 | A * | 1/1997 | Hoppner et al. .......... 123/198 E |
| 6,464,018 | B1 * | 10/2002 | Uhl ............................ 173/162.2 |
| 6,755,160 | B2 | 6/2004 | Zimmermann |
| 6,959,701 | B2 * | 11/2005 | Zimmermann et al. ...... 123/590 |
| 2002/0189110 | A1 * | 12/2002 | Durr et al. ....................... 30/383 |
| 2003/0183186 | A1 * | 10/2003 | Zimmermann et al. . 123/184.23 |
| 2006/0179602 | A1 * | 8/2006 | Schliemann et al. ........... 15/330 |
| 2010/0139608 | A1 * | 6/2010 | Mornhinweg et al. ... 123/195 R |
| 2012/0048582 | A1 * | 3/2012 | Yamada et al. ............ 173/162.2 |

* cited by examiner

*Primary Examiner* — Marguerite McMahon
(74) *Attorney, Agent, or Firm* — Walter Ottesen, P.A.

(57) ABSTRACT

A handheld work apparatus has at least one tool which is driven by a combustion engine. A portion of an intake channel of the combustion engine is formed by an elastic connecting piece which has a first section and a second section between which an expansion fold is arranged. The expansion fold has a first side wall and a second side wall arranged downstream of the first side wall. A peripheral wall, which extends in the region of the largest outside diameter (a) of the expansion fold, is arranged in flow direction between the first side wall and the second side wall. The connecting piece has a stop for the expansion fold which prevents a segment of the first side wall adjoining the peripheral wall from bearing against the second side wall.

16 Claims, 6 Drawing Sheets

Fig. 5
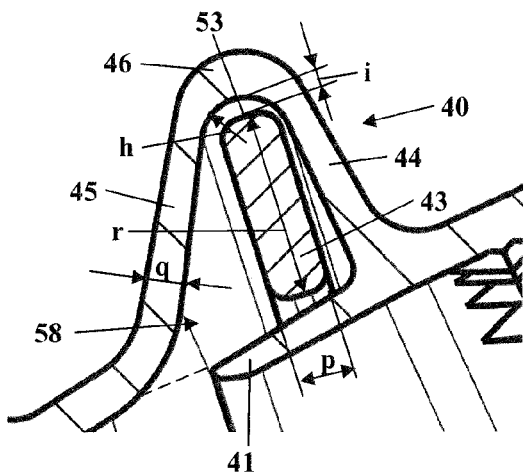
Fig. 6
Fig. 7
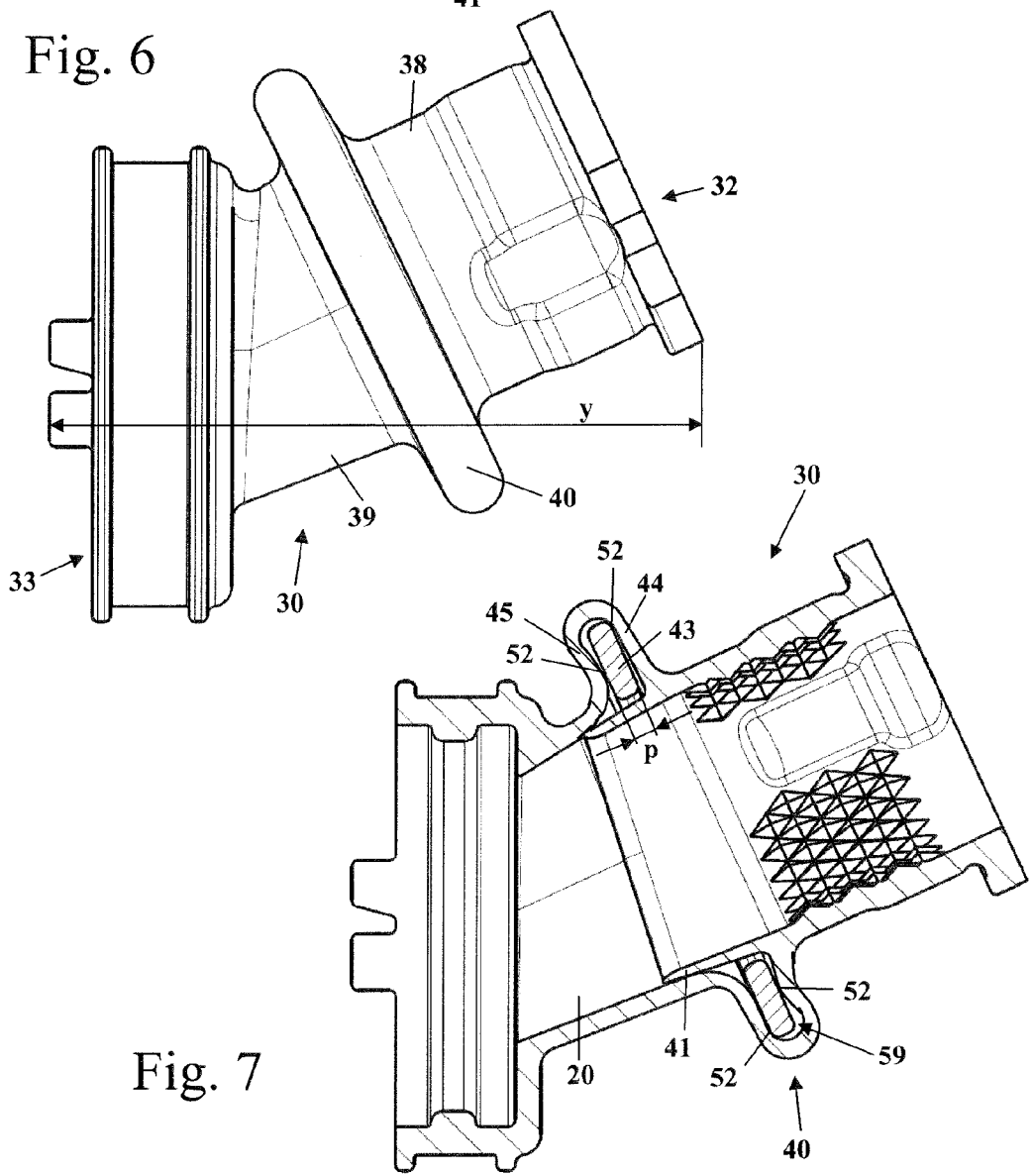

HANDHELD WORK APPARATUS AND ELASTIC CONNECTING PIECE FOR A HANDHELD WORK APPARATUS

CROSS REFERENCE TO RELATED APPLICATION

This application claims priority of German patent application no. 10 2013 012 510.3, filed Jul. 27, 2013, the entire content of which is incorporated herein by reference.

BACKGROUND OF THE INVENTION

U.S. Pat. No. 6,755,160 discloses a combustion engine for a handheld work apparatus having an elastic intake connecting piece with an expansion fold. The combustion engine has a channel which connects the interior of the expansion fold to the crankcase. The fuel collected in the expansion fold is conducted away into the crankcase via the duct. However, the formation of the separate channel is comparatively complicated.

SUMMARY OF THE INVENTION

It is an object of the invention to provide a handheld work apparatus which has a simple configuration and has good operating behavior. A further object of the invention is to provide a connecting piece for a handheld work apparatus which allows a simple configuration and good operating behavior of the handheld work apparatus.

It has been shown that fuel from the expansion fold which overflows in a surge-like manner into the crankcase is problematic for the running behavior of the combustion engine and thus for the operating behavior of the work apparatus. Surge-like overflowing of fuel can lead to combustion misfirings and thus to unsteady running up to a point where the combustion engine cuts out. This surge-like overflowing of fuel occurs when fuel accumulates in the expansion fold and the expansion fold is then compressed by relative movements of the two portions of the connecting piece with respect to one another and the fuel collected therein is pressed out. It has also been found that in particular the fuel volume accumulated adjacent to the peripheral wall of the expansion fold is critical since a large fuel volume is accumulated here on account of the large circumference, which volume is pressed out by a comparatively small relative movement.

In order to avoid the pressing-out of the fuel volume arranged adjacent to the peripheral wall, a stop is provided for the expansion fold, which stop prevents a portion of the first side wall which adjoins the peripheral wall from being able to bear against the second side wall. As a result, it is possible in a simple manner to prevent the fuel volume at the peripheral wall of the expansion fold from being able to be pressed out into the intake channel. Consequently, a smooth, uniform running behavior of the combustion engine can be achieved. An additional channel for conducting away fuel which has accumulated in the expansion fold can be dispensed with in the interior of the crankcase, resulting in a simple construction.

The portion of the first side wall which cannot bear against the second side wall is advantageously a circular ring-shaped portion which extends over at least 30% of the width of the first side wall. Here, the width of the first side wall is measured radially outwardly with respect to a longitudinal center axis of the intake channel. The width of the circular ring-shaped portion is advantageously at least approximately 1.5 mm, in particular at least approximately 2.0 mm, preferably at least approximately 2.5 mm. Advantageously, a residual volume is enclosed by the expansion fold at the peripheral wall in each position of the first portion relative to the second portion. The residual volume is advantageously at least 50% of the volume enclosed by the expansion fold when the connecting piece is unloaded.

The proposed configuration is particularly advantageous for an expansion fold having a very large outside diameter. The greater the outside diameter of the peripheral wall of the expansion fold, the more that fuel can accumulate adjacent to the peripheral wall of the expansion fold. Large outside diameters are particularly necessary in the case of intake connecting pieces which must allow large relative movements of the two portions of the intake connecting piece with respect to one another. The large outside diameter of the expansion fold can additionally achieve high durability, in particular at low temperatures. The stop provided is advantageously provided for a connecting piece in which the largest outside diameter of the peripheral wall of the expansion fold is at least approximately 175%, in particular at least approximately 185%, of the inside diameter of the connecting piece in the first portion directly upstream of the expansion fold.

In order to keep the fuel volume accumulated in the connecting piece as low as possible, it is provided that, in the unloaded state of the connecting piece, the inner radius of the expansion fold at the peripheral wall with which the first side wall merges into the peripheral wall and the peripheral wall merges into the second side wall is less than approximately 10%, in particular less than approximately 5%, of the largest outside diameter of the expansion fold at the peripheral wall. By virtue of the fact that the inner radius of the expansion fold at the peripheral wall is comparatively small, the fuel volume which can accumulate adjacent to the peripheral wall at the expansion fold is less than in the case of a connecting piece in which the inner radius of the expansion fold is large. However, in the case of a small inner radius at the peripheral wall of the expansion fold, there is the risk that the two side walls bear completely against one another and as a result the residual volume in the expansion fold is completely pressed out during a corresponding movement of the two portions of the connection piece with respect to one another. This can be prevented by the stop provided.

The stop is advantageously formed such that it runs continuously around the intake channel. The stop preferably has a ring-shaped design. However, it can also be provided that the stop is formed by a plurality of elevations arranged on at least one side wall. Elevations can also be provided on both side walls. The elevations can be distributed uniformly around the intake channel or be arranged nonuniformly. A simple design results if the stop is formed as a thickening on at least one side wall. The wall thickness of the side wall at the thickening is advantageously at least 1.5 times, in particular at least twice, the wall thickness of the side wall at a point without thickening. In order to achieve a wall thickness of the connecting piece which is as uniform as possible, it can also be provided, however, that at least one side wall has an irregular course which forms the stop. Here, the wall thickness of the side wall is advantageously as uniform as possible. The change in the wall thickness is advantageously less than approximately 30%, in particular less than approximately 20%, preferably less than approximately 10%, of the largest wall thickness of the side wall. On account of the uniform wall thickness, the production can be improved in a simplified manner. The wall thickness is advantageously comparatively small. It has been found to be advantageous to have a wall thickness of approximately 0.5 mm to approximately 2.5 mm, in particular of approximately 1 mm to approximately 2 mm, preferably of approximately 1.3 mm to approximately 1.5 mm. A thin, uniform wall thickness allows high resistance to low temperatures and high durability. The wall thickness of the expansion fold is advantageously less than the wall thickness in the portions of the connecting piece upstream and downstream of the expansion fold.

The stop is particularly advantageously arranged on the first side wall of the expansion fold. However, it can also be provided that the stop is formed on a separate component which is inserted into the expansion fold. The separate component reduces the maximum fuel volume which can accumulate in the expansion fold. The separate component is advantageously a disc in which a spacing between its outer circumference and the peripheral wall is less than approximately 2.5 mm. Here, it is also possible for two or more discs to be provided in the expansion fold, which discs form the stop.

The connecting piece advantageously has a lip which covers the expansion fold with respect to the intake channel in the completely compressed state of the connecting piece. As a result, turbulence in the flow in the region of the expansion fold is reduced. The stop is in particular arranged on the side of the lip facing away from the intake channel.

The work apparatus advantageously has a handle unit which is connected via at least one anti-vibration element to an engine unit comprising the combustion engine. The connecting piece is advantageously connected by one end to the handle unit and by the other end to the engine unit.

For an elastic connecting piece for a handheld work apparatus which has a first and a second portion between which there is arranged an expansion fold which allows relative movements between the first and the second portion, wherein the expansion fold has a first and a second side wall between which there is arranged a peripheral wall of the expansion fold which connects the two side walls and is arranged in the region of the largest outside diameter, a stop is provided which prevents a portion of the first side wall which adjoins the peripheral wall from bearing against the second side wall.

BRIEF DESCRIPTION OF THE DRAWINGS

The invention will now be described with reference to the drawings wherein:

FIG. 5 shows a detail from FIG. 4 in the region of the expansion fold in an enlarged illustration;

FIG. 6 shows the connecting piece of the power saw in side view in a completely compressed state;

FIG. 7 shows a section through the connecting piece from FIG. 6;

DESCRIPTION OF THE PREFERRED EMBODIMENTS OF THE INVENTION

Figure 1:
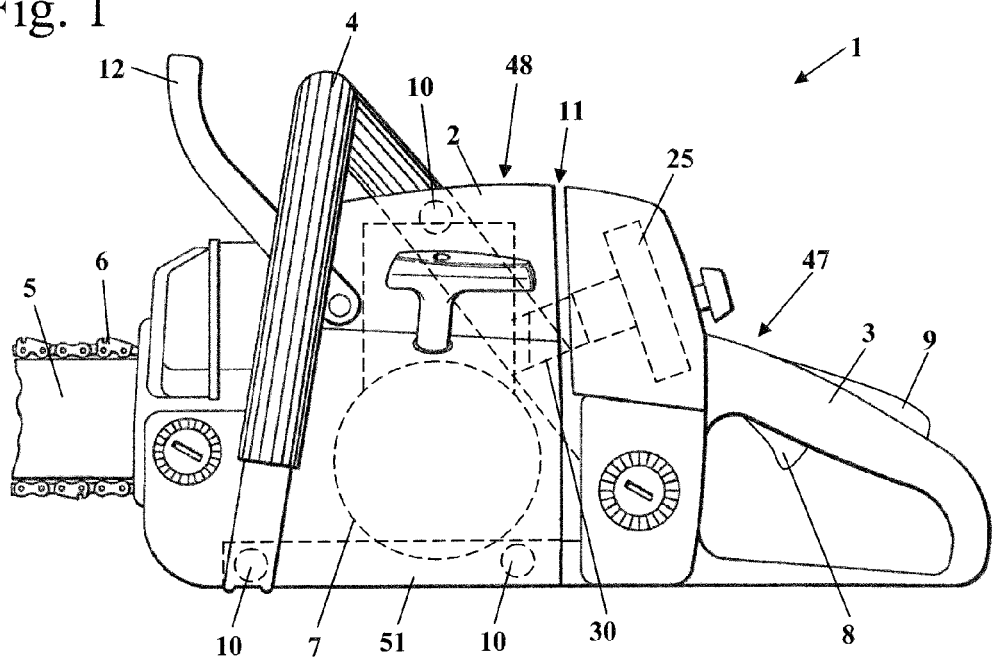
FIG. 1 shows a schematic illustration of a power saw in side view.

FIG. 1 shows a motor-driven chain saw 1 as an exemplary embodiment for a handheld work apparatus. However, the handheld work apparatus can also be another work apparatus such as, for example, a cutoff machine, a brushcutter, a blower apparatus, a harvesting apparatus or the like.

The motor-driven chain saw 1 has a housing 2 on which a rear handle 3 and a bale handle 4 are fixed. The rear handle 3 and the bale handle 4 are part of a handle unit 47. The handle unit 47 includes a web 51 on which a front end of the bale handle 4 is fixed. The handle unit 47 is connected to an engine unit 48 via a plurality of antivibration elements 10. The handle unit 47 and the engine unit 48 are separated from one another by a vibration gap 11 which is bridged by the antivibration elements 10 and which allows relative movements between the handle unit 47 and the engine unit 48.

In the housing 2 there is arranged a combustion engine 7 which serves for driving a tool of the chain saw 1, namely, a saw chain 6. The saw chain 6 is arranged such that it can run around on a guide bar 5. The guide bar 5 projects forward on the end of the housing 2 situated opposite to the rear handle 3. On the side of the bale handle 4 facing the saw chain 6, a hand protective bracket 12 is arranged on the housing 2. The bracket 12 can be pivotably mounted and can serve for releasing a braking device (not shown) for the saw chain 6.

A throttle lever 8 and a throttle lever lock 9 are pivotably mounted on the rear handle 3. The combustion engine 7 draws in combustion air via an air filter 25 which is arranged on the handle unit 47. The air filter 25 is connected to the combustion engine 7 via an elastic connecting piece 30 which bridges the vibration gap 11.

Figure 2:
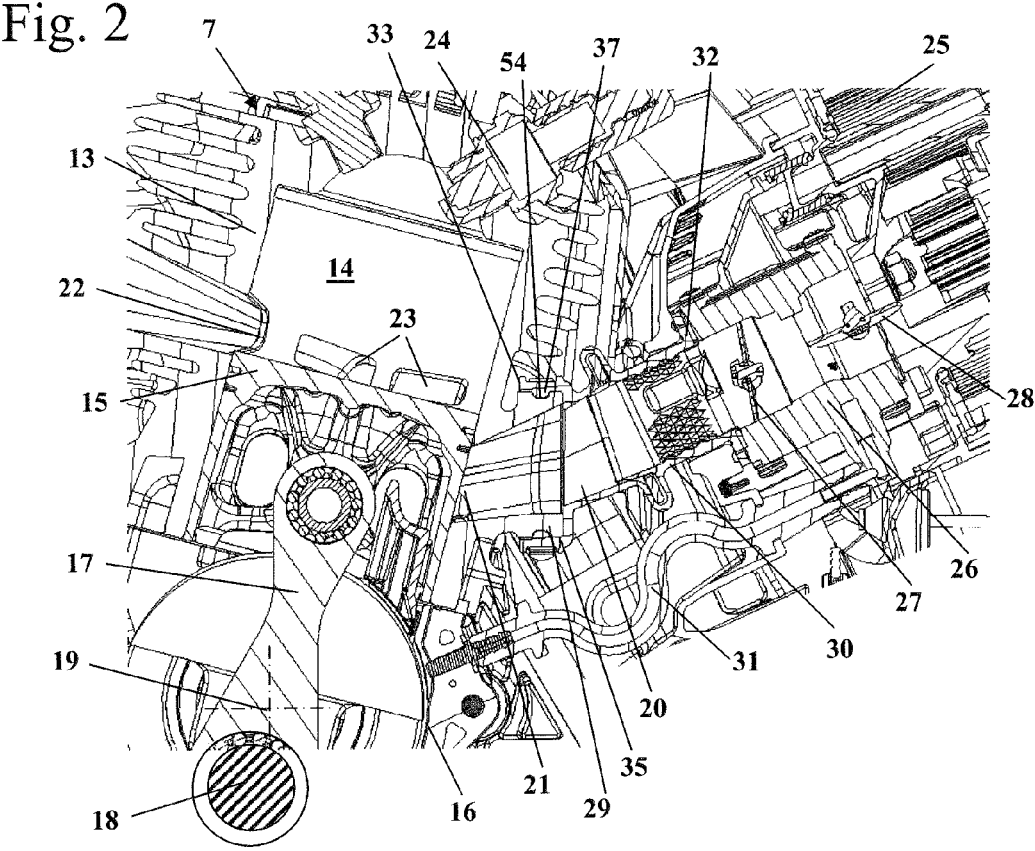
FIG. 2 shows a section through the combustion engine of the power saw from FIG. 1.

As FIG. 2 shows, the combustion engine 7 has a cylinder 13 in which a combustion chamber 14 is formed. The combustion chamber 14 is delimited by a piston 15 which is mounted such that it can move to and fro in the cylinder 13 and which, via a connecting rod 17, drives a crankshaft 18 rotatably mounted in a crankcase 16. The crankshaft 18 is mounted such that it can rotate about an axis of rotation 19. The interior of the crankcase 16 is connected to the combustion chamber 14 via transfer channels 23 when the piston 15 is situated in the region of bottom dead center. Projecting into the combustion chamber 14 is a spark plug 24 which serves to ignite the fuel/air mixture in the combustion chamber 14.

The air filter 25 is connected to the combustion engine 7 via an intake channel 20. The intake channel 20 opens with an inlet 21 on the cylinder bore, which inlet is controlled by the piston 15. In the region of top dead center of the piston 15, the inlet 21 is opened toward the interior of the crankcase 16. Leading from the combustion chamber 14 is an outlet 22 which is likewise port-controlled by the piston 15 and which is opened in the region of bottom dead center of the piston 15.

Figure 14:
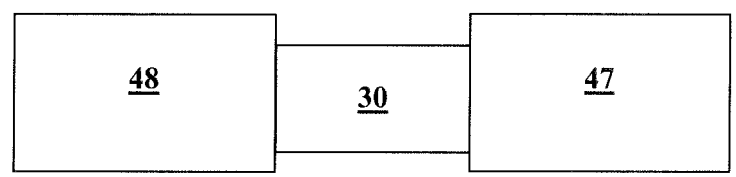

A portion of the intake channel 20 is formed in a carburetor 26. In the carburetor 26, fuel is fed to the combustion air drawn in via the air filter 25. In the exemplary embodiment, a throttle element 27 and choke element 28 are pivotably mounted in the carburetor 26. The throttle element 27 is configured as a throttle flap and the choke element 28 as a choke flap. The connecting piece 30 is arranged downstream of the carburetor 26. In the exemplary embodiment, the carburetor 26 is arranged directly on the bottom of the air filter. The connecting piece 30 has a first, upstream end 32 and a second, downstream end 33. The first end 32 of the connecting piece 30 is fixed to the downstream side of the carburetor 26. In the exemplary embodiment, the second end 33 of the connecting piece 30 is fixed to a cylinder flange 29 of the cylinder 13. The connecting piece 30 has at its second end 33 a collar 35 which engages over the cylinder flange 29. The collar 35 has an inwardly projecting elevation 37 which engages in a peripheral recess 54 of the cylinder flange 29. As shown in FIG. 14, the connecting piece 30 has a first end connected to the handle unit 47 and a second end connected to the motor unit 48.

In operation, during the upward stroke of the piston 15, fuel/air mixture is drawn via the intake channel 20 into the interior of the crankcase 16. During the downward stroke of the piston 15, the fuel/air mixture is compressed in the crankcase 16. As soon as the transfer channels 23 are opened toward the combustion chamber 14 by the piston 15, the fuel/air mixture transfers from the interior of the crankcase 16 into the combustion chamber 14. During the subsequent upward stroke of the piston 15, the fuel/air mixture is compressed in the combustion chamber 14 and ignited by the spark plug 24 in the region of top dead center of the piston 15. The subsequent combustion in the combustion chamber 14 accelerates the piston 15 in the direction of the crankcase 16. As soon as the outlet 22 opens, the exhaust gases flow out of the combustion chamber 14. Fresh mixture for the next engine cycle then flows via the transfer channels 23 into the combustion chamber 14. In order to feed the fuel, a fuel pump (not shown) is provided on the carburetor 26. The fuel pump is driven via the fluctuating pressure inside the crankcase 16 and for this purpose is connected to the interior of the crankcase 16 via pulse channel 31.

Figure 3:
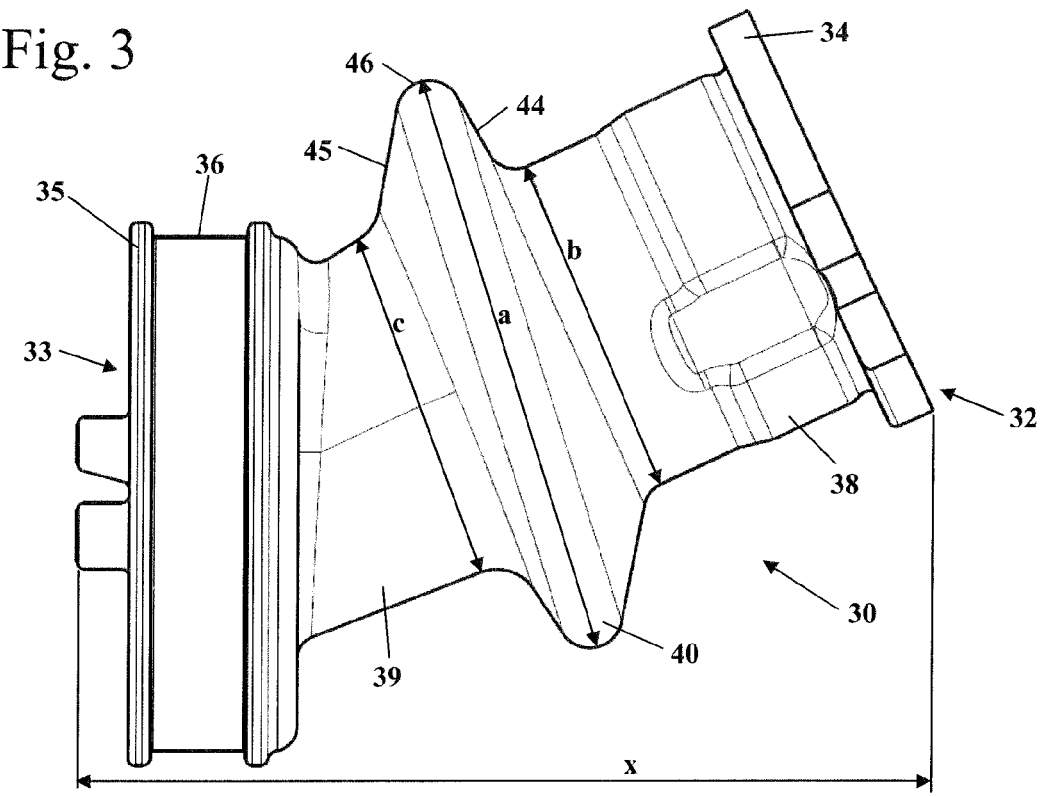
FIG. 3 shows a side view of the connecting piece of the power saw from FIG. 1 in an unloaded state.
Figure 4:
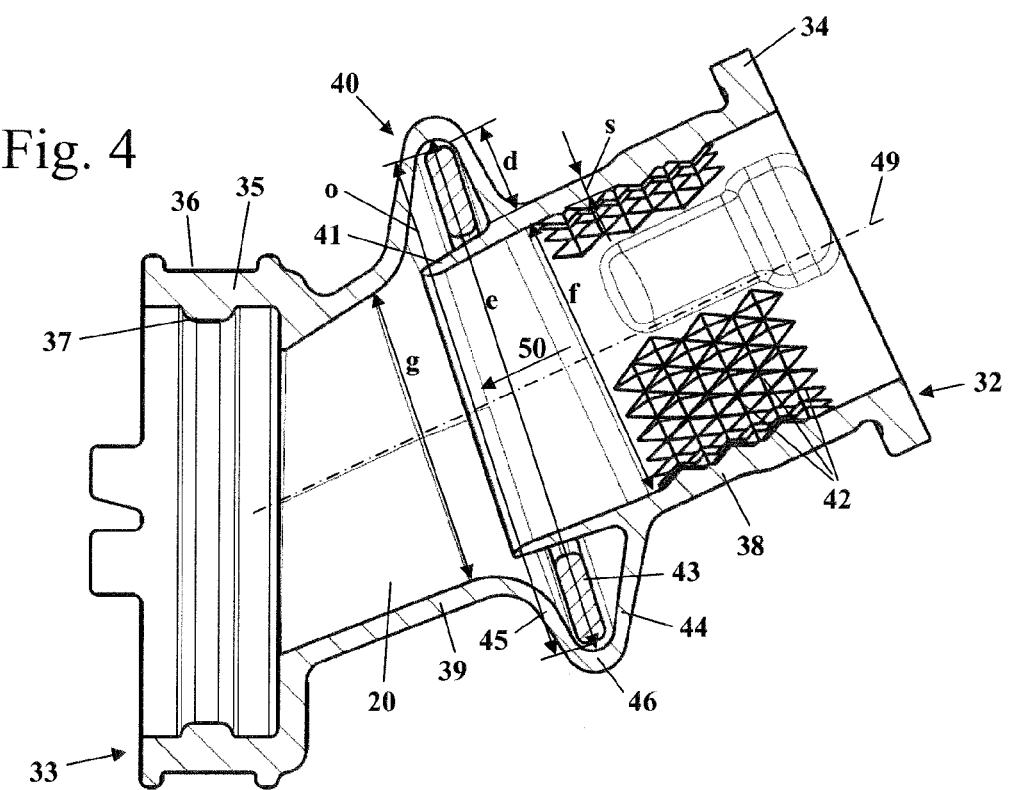
FIG. 4 shows a section through the connecting piece from FIG. 3.

FIGS. 3 and 4 show the construction of the connecting piece 30 in detail. The connecting piece 30 has a first section 38 and a second section 39. An expansion fold 40 is arranged between the two sections 38 and 39. With respect to the flow direction 50 shown in FIG. 4, the first section 38 is arranged in the intake channel 20 upstream of the second section 39. Here, the flow direction 50 is the direction in which fuel/air mixture flows from the carburetor 26 to the crankcase 16.

At the first end 32, the connecting piece 30 has an edge 34 which projects outwardly and serves for fixing the connecting piece 30 to the carburetor 26. As FIG. 3 shows, the collar 35 at the second end 33 has a peripheral recess 36 in which there is arranged a clamp for fixing the connecting piece 30 to the cylinder flange 29 (FIG. 2). The clamp presses the elevation 37 into the peripheral recess 54 such that the connecting piece 30 is securely held on the cylinder flange 29. As FIG. 3 shows, the connecting piece 30 has an outside diameter (b) in the first section 38 directly upstream of the expansion fold 40. The connecting piece 30 has a largest outside diameter (a) on the expansion fold 40. The second section 39 has an outside diameter (c) directly downstream of the expansion fold 40. The outside diameter (a) on the expansion fold 40 is considerably larger than the outside diameters (b) and (c) upstream and downstream of the expansion fold 40. The connecting piece 30 is widened at the expansion fold 40. The expansion fold 40 is designed in the manner of bellows and has a first side wall 44 arranged upstream and a second side wall 45 arranged downstream. The side walls 44 and 45 are connected to one another via a peripheral wall 46 on which the largest outside diameter (a) is measured.

As FIG. 4 shows, the first side wall 44 extends outwardly with an inclination to a longitudinal center axis 49 of the connecting piece 30. The longitudinal center axis 49 extends through the centroids of all the cross sections through the connecting piece 30 which are arranged perpendicular to the flow direction 50. Here, the side wall 44 can extend straight in a section plane which contains the longitudinal center axis 49. In the exemplary embodiment, the side wall 44 extends straight in the section plane shown. The outside diameter and also the inside diameter of the expansion fold 40 increase continuously on the first side wall 44. The outside diameter and also the inside diameter decrease continuously on the second side wall 45. The side wall 45 can also extend straight in a section plane containing the longitudinal center axis 49.

The connecting piece 30 has in the first section 38 a multiplicity of elevations 42 which have a pyramid-shaped design in the exemplary embodiment and are arranged directly adjoining one another. The elevations 42 are arranged in such a way that channels are formed between the elevations 42, which channels extend spirally along the inner circumference of the connecting piece 30. Fuel can accumulate between the elevations 42. In the first portion 38, the connecting piece 30 has a wall thickness (s) which is measured at the base of the elevations 42.

As FIG. 4 shows, the first section 38 has an inside diameter (f) directly upstream of the expansion fold 40. The second section 39 has an inside diameter (g) directly downstream of the expansion fold 40. The inside diameters (f) and (g) can be approximately the same size. At the expansion fold 40, the connecting piece 30 has an inside diameter (e) which is considerably larger than the inside diameters (f) and (g). The largest outside diameter (a) of the peripheral wall 46 of the expansion fold 40 is at least approximately 175% of the inside diameter (f) of the connecting piece in the first section 38 directly upstream of the expansion fold 40. The largest outside diameter (a) of the peripheral wall 46 is advantageously at least approximately 185% of the inside diameter (f) of the connecting piece 30. In the exemplary embodiment, the largest outside diameter (a) of the peripheral wall 46 is approximately twice the inside diameter (f) of the connecting piece 30.

In FIG. 4, the width (d) of the side wall 44 of the expansion fold 40 is also depicted. The connecting piece 30 has a lip 41 which, in the partially and completely compressed state of the two sections 38 and 39, closes the interior of the expansion fold 40 with respect to the intake channel 20. The width (d) of the side wall 44 is measured from the region at which the side wall 44 merges into the lip 41 to the start of the peripheral wall 46. The width (d) is advantageously at least 5%, in particular at least 10%, of the largest outside diameter (a). In the exemplary embodiment, the width (d) is approximately 15% of the outside diameter (a). The inside diameter (f) upstream of the expansion fold 40 is advantageously approximately 40% to approximately 70%, in particular approximately 50% to approximately 60%, of the inside diameter (e) at the expansion fold 40.

A disc 43 which reduces the free cross section of the expansion fold 40 is arranged in the expansion fold 40. The disc 43 extends between the lip 41 and the peripheral wall 46. The disc 43 has an outside diameter (o) which is somewhat less than the inside diameter (e) of the expansion fold 40. The outside diameter (o) is advantageously approximately 90% to approximately 99.5%, in particular approximately 95% to approximately 99%, of the inside diameter (e). The disc 43 has a thickness (p) which is advantageously approximately 2% to approximately 10%, in particular approximately 3% to approximately 8%, of the outside diameter (o) of the disc 43. The thickness (p) is depicted in FIG. 5. The thickness (p) can be, for example, approximately 1 mm to approximately 3 mm.

FIG. 5 shows the design of the expansion fold 40 in detail. The expansion fold 40 has an inner radius (h) on the peripheral wall 46. The inner radius (h) is the radius with which the first side wall 44 merges into the peripheral wall 46 and the peripheral wall 46 merges into the second side wall 45. Here, the inner radius (h) can vary in the course from the first side wall 44 to the second side wall 45 and does not have to be constant. However, a constant course of the inner radius (h) may also be advantageous. The inner radius (h) is advantageously less than approximately 10% of the largest outside diameter (a) of the expansion fold 40 at the peripheral wall 46. The inner radius (h) is in particular less than approximately 5% of the largest outside diameter (a) (FIG. 3). By virtue of the fact that the inner radius (h) is comparatively small, a high degree of elasticity of the expansion fold 40 results. Here, the wall thickness (q) of the expansion fold 40 is advantageously approximately constant over the first side wall 44, the peripheral wall 46 and the second side wall 45. An approximately constant course of the wall thickness (q) is obtained when the largest wall thickness is at most 130%, advantageously at most approximately 120%, in particular at most approximately 110%, of the smallest wall thickness of the expansion fold 40. Here, the wall thickness (q) of the expansion fold 40 is advantageously smaller than the wall thickness (s) in the first portion 38. The wall thickness in the second portion 39 is advantageously larger than the wall thickness (q) of the expansion fold 40 and corresponds in particular approximately to the wall thickness (s). The wall thickness (q) of the expansion fold 40 is advantageously approximately 0.5 mm to approximately 2.5 mm, in particular approximately 1 mm to approximately 2 mm, preferably approximately 1.3 mm to approximately 1.5 mm.

As FIG. 5 shows, the disc 43 has a width (r) which corresponds to the difference from the outer radius to the inner radius of the disc 43. The width (r) is advantageously only slightly less than the width (d) of the first side wall 44 which is shown in FIG. 4. The disc 43 has an outer wall 53 which has a spacing (i) from the peripheral wall 46. The spacing (i) is advantageously very small and is in particular less than approximately 2.5 mm. The spacing (i) is in particular less than half of the thickness (p) of the disc 43.

As FIG. 3 shows, the connecting piece 30 has a length (x) in the unloaded state. FIGS. 6 and 7 show the connecting piece 30 in the completely compressed state. In this state, the connecting piece 30 has a length (y) which is less than the length (x). In the exemplary embodiment, the lengths (x) and (y) are measured perpendicular to the connecting surface at the second end 33. As FIG. 7 shows, the first side wall 44 bears against a stop 52 of the disc 43 in the completely compressed state of the connecting piece 30. The second side wall 45 also bears against a stop 52 formed on the disc 43. As a result, the first side wall 44 cannot bear against the second side wall 45 even in the completely compressed state of the connecting piece 30. The side walls 44 and 45 have a spacing from one another which corresponds at each point to at least the thickness (p) of the disc 43. The expansion fold 40 delimits a residual volume 59 which is at least 50% of the volume 58 enclosed by the expansion fold 40 when the connecting piece 30 is unloaded (FIG. 5). Here, the volume 58 also includes the volume of the disc 43. The residual volume 59 also includes the volume of the disc 43. By virtue of the stops 52 on the disc 43, the difference between the volume 58 and residual volume 59 can be kept comparatively small, with the result that, when the connecting piece 30 is compressed, only small amounts of fuel can pass into the intake channel 20. Nevertheless, on account of the disc 43, a very large outside diameter (a) on the expansion fold 40 can be achieved, with the result that the connecting piece 40 has a high degree of elasticity and durability. On account of the bevel on its side situated downstream in the flow direction, the lip 41 itself does not form a stop but bears against the inside of the second section 39.

Figure 8:
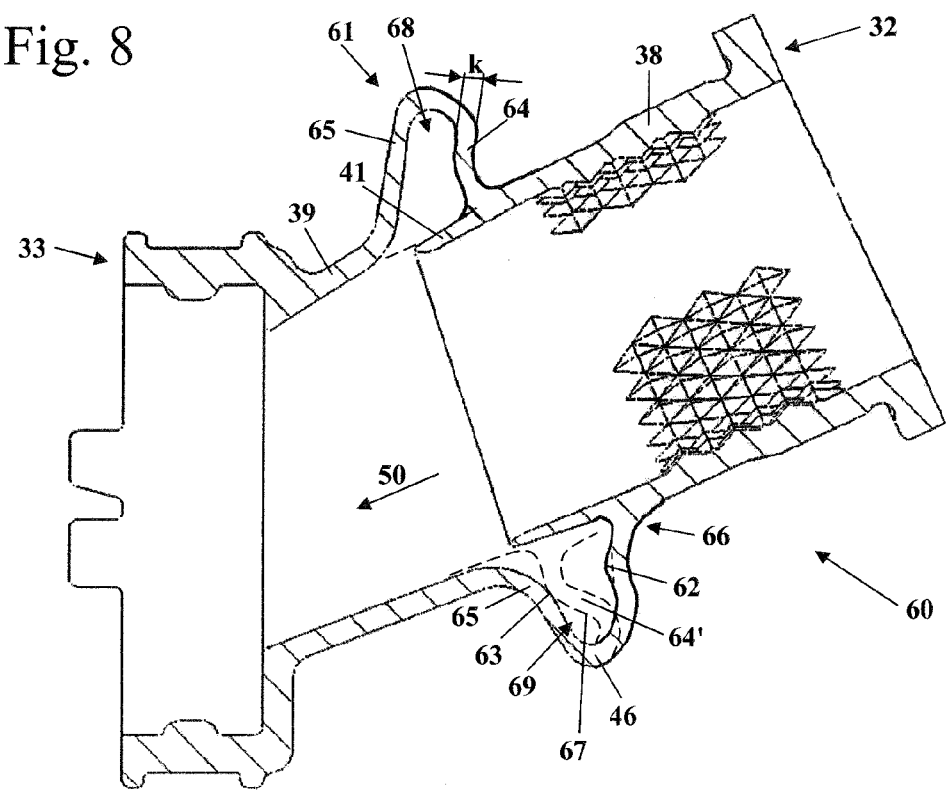
FIGS. 8 to 10 show sectional illustrations of exemplary embodiments of connecting pieces in an unloaded state.

FIG. 8 shows an exemplary embodiment of a connecting piece 60 whose construction substantially corresponds to that of the connecting piece 30. Here, identical reference signs denote elements which correspond to one another. The connecting piece 60 has an expansion fold 61 which is arranged between a first section 38 and a second section 39 of the connecting piece 60. The expansion fold 61 has a first side wall 64 arranged upstream and a second side wall 65 arranged downstream. The first side wall 64 is connected to the second side wall 65 via the peripheral wall 46. FIG. 8 shows the connecting piece 60 in the unloaded state. In this state, the expansion fold 61 encloses a volume 68. Here, the volume 68 is measured up to the extension of the wall of the second portion 39. The lip 41 also delimits the volume 68 which is enclosed by the expansion fold 61. FIG. 8 schematically shows the position of the expansion fold 61 in the completely compressed state of the connecting piece 60. Here, the first side wall 64 is deformed. The deformed state of the first side wall 64 is designated by 64'. As FIG. 8 also shows, the first side wall 64 has an elevation 62 which is advantageously designed as a circular ring-shaped elevation. The wall thickness (k) of the first side wall 64 is approximately constant. The elevation 62 results on account of the irregular, curved course of the first side wall 64. The elevation 62 is the region which projects beyond a straight connection of the foot 66 of the first side wall 64 up to the peripheral wall 46. Here, the foot 66 of the side wall 64 is the region at which the side wall 64 merges or transitions into the first section 38. The largest wall thickness (k) of the first side wall 64 is advantageously at most approximately 130%, in particular less than approximately 120%, preferably less than approximately 110%, of the smallest wall thickness (k).

As FIG. 8 shows, the elevation 62 forms a stop 63 in the completely compressed state of the connecting piece 60, which stop bears against the first side wall 64. As a result, the first side wall 64 cannot bear completely against the second side wall 65. In particular, the outer region of the side wall 64 arranged adjacent to the peripheral wall 46 is prevented from bearing against the second side wall 65. The first side wall 64 has a section 67 which extends adjacent to the peripheral wall 46 and which, on account of the stop 63, cannot bear against the second side wall 65. In the completely compressed state of the connecting piece 60, the expansion fold 61 encloses a residual volume 69 which is composed of the residual volume arranged adjacent to the peripheral wall 46 and the residual volume arranged between the stop 63 and the lip 41. The residual volume 69 corresponds to at least 50% of the volume 68 which is enclosed by the expansion fold 61 in the unloaded state of the connecting piece 60.

Figure 9:
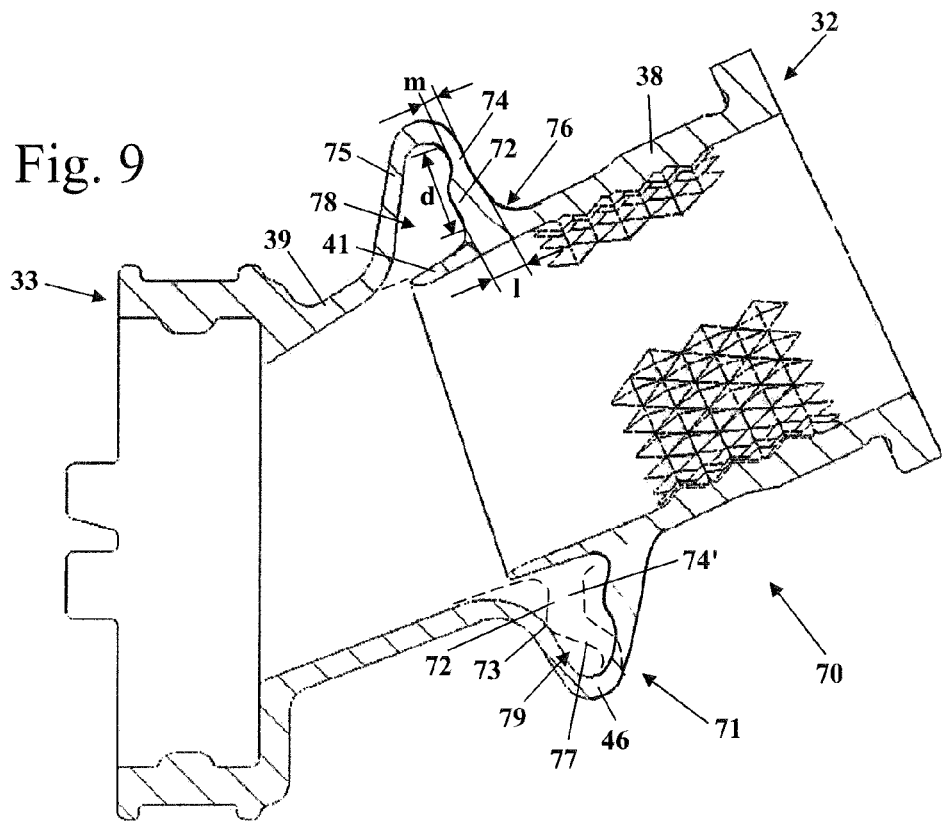

FIG. 9 shows an exemplary embodiment for a connecting piece 70 whose design is similar to the design of the connecting piece 60. Here, too, identical reference signs denote elements corresponding to one another. The connecting piece 70 has an expansion fold 71 which has a first, upstream side wall 74 and a second, downstream side wall 75. The two side walls (74, 75) are connected to one another by a peripheral wall 46. As FIG. 9 shows, the first side wall 74 has an elevation 72 which is formed by a thickening of the side wall 74. In the region of the elevation 72, the expansion fold 71 has a wall thickness (l) which is advantageously at least 1.5 times the size of the wall thickness (m) in the region of the side wall 74 which does not have an elevation 72. The wall thickness (l) is advantageously at least twice the wall thickness (m). In the unloaded state of the connecting piece 70, the expansion fold 71 encloses a volume 78 which is measured up to the extension, depicted by a dashed line, of the portion 38 or of the lip 41.

Once the connecting piece 70 is compressed, the first side wall 74 deforms. The position of the side wall 74 in the completely compressed state of the connecting piece 70 is schematically depicted with a dashed line and designated by 74'. In this position, the elevation 72 forms a stop 73 which prevents the first side wall 74 from being able to bear completely against the second side wall 75. A deformation of the second side wall 75 can also be provided. The first side wall 74 has a portion 77 which adjoins the peripheral wall 46 and which extends over approximately half of the width (d) of the side wall 74. In the completely compressed state, the expansion fold 71 encloses a residual volume 79 which is composed of the volume arranged adjacent to the peripheral wall 46 between the side walls 74 and 75 and of the volume arranged adjacent to the lip 41 between the side walls 74 and 75. The residual volume 79 is advantageously at least 50% of the volume 78. As a result, at least half of the fuel accumulated in the expansion fold 71 can remain in the expansion fold 71 even in the compressed state of the connecting piece 70. As FIG. 9 also shows, the elevation 72 is arranged adjacent to the foot 76 of the first side wall 74 and extends approximately to the center of the first side wall 74.

Figure 10:
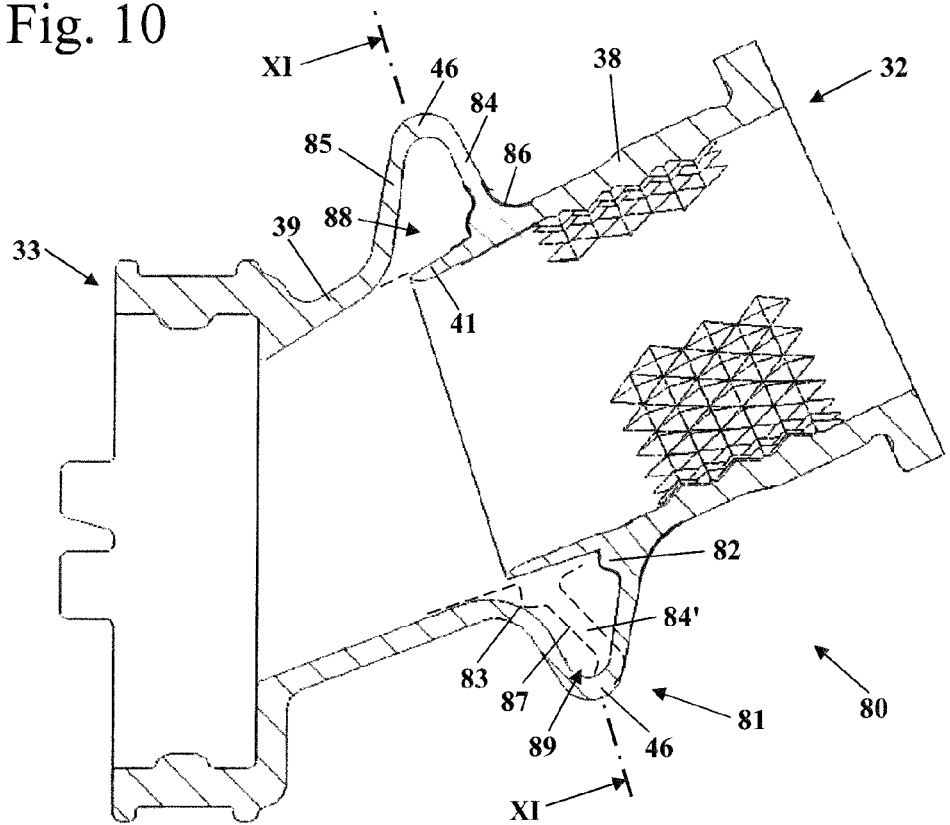

In the exemplary embodiment of a connecting piece 80 shown in FIG. 10, an elevation 82 is provided on a first side wall 84 of an expansion fold 81. The elevation 82 is arranged adjacent to a foot 86 of the first side wall 84. The first side wall 84 merges into the first section 38 of the connecting piece 80 at the foot 86. In the unloaded state of the connecting piece 80, the first side wall 84 and a second side wall 85 enclose a volume 88 which is measured up to an extension, depicted by a dashed line, of the lip 41. In the completely compressed state of the connecting piece 80 which is designated by 84' in FIG. 10, a residual volume 89 is enclosed between the side walls 84 and 85 and the lip 41, which residual volume advantageously corresponds to at least 50%, in particularly at least approximately 60%, of the volume 88. Here, the elevation 82 forms a stop 83 which bears against the second side wall 85. In the exemplary embodiment, the stop 83 is arranged in such a way that it bears against the second side wall 85 adjacent to the second section 39 of the connecting piece 80. As FIG. 10 shows, the stop 83 has the effect that a circular ring-shaped portion 87 of the side wall 84 which adjoins the peripheral wall 46 cannot bear against the second side wall 85.

Figure 11:
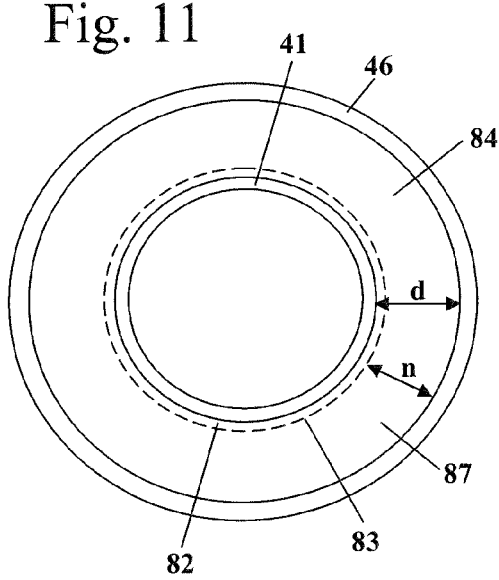
FIG. 11 shows a section along the line XI-XI in FIG. 10 in a schematic illustration.

FIG. 11 schematically shows the circular ring-shaped portion 87. The circular ring-shaped portion 87 extends between the peripheral wall 46 and the stop 83 which is depicted by dashes in FIG. 11. The circular ring-shaped portion 87 has a width (n) which is advantageously at least 30% of the width (d) of the first side wall 84. The width (n) is advantageously more than 50% of the width (d), in particular more than 70% of the width (d). In all exemplary embodiments, the width (n) is advantageously at least approximately 1.5 mm, in particular at least approximately 2 mm, preferably at least approximately 2.5 mm.

Figure 12:
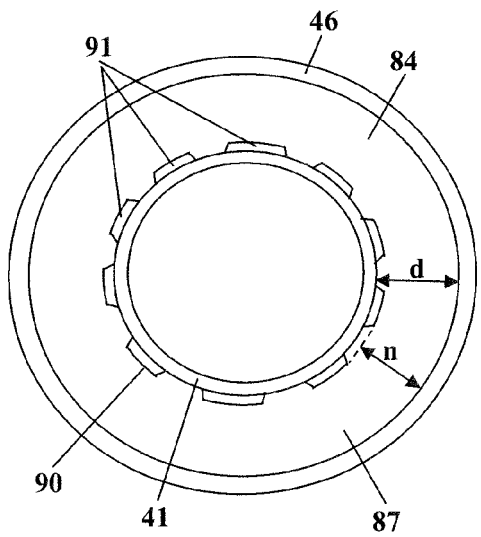
FIG. 12 shows a section along the line XI-XI in FIG. 10 for an exemplary embodiment of the connecting piece.

In the exemplary embodiment shown in FIG. 11 for a section through the connecting piece 80, the elevation 83 is designed as a circular ring encircling the entire circumference of the connecting piece 80. FIG. 12 shows an exemplary embodiment in which a plurality of individual elevations 91 are arranged in a distributed manner over the circumference. In the illustration in FIG. 12, the elevations 91 are arranged uniformly around the outer circumference of the lip 41. Alternatively, an irregular arrangement of the elevations 91 may also be advantageous. The elevations 91 form a stop 90 which prevents the first side wall 84 from being able to bear completely against the second side wall 85.

In the exemplary embodiments shown in FIGS. 8 to 12, the stop (63, 73, 83, 90) is in each case arranged on the first side wall (64, 74, 84). However, it may also be advantageous to provide, in addition or alternatively, one or more stops on the second side wall (65, 75, 85). In all exemplary embodiments, the stop (52, 63, 73, 83, 90) is arranged on the side of the lip 41 facing away from the intake channel 20, that is, outside of the intake channel 20.

Figure 13:
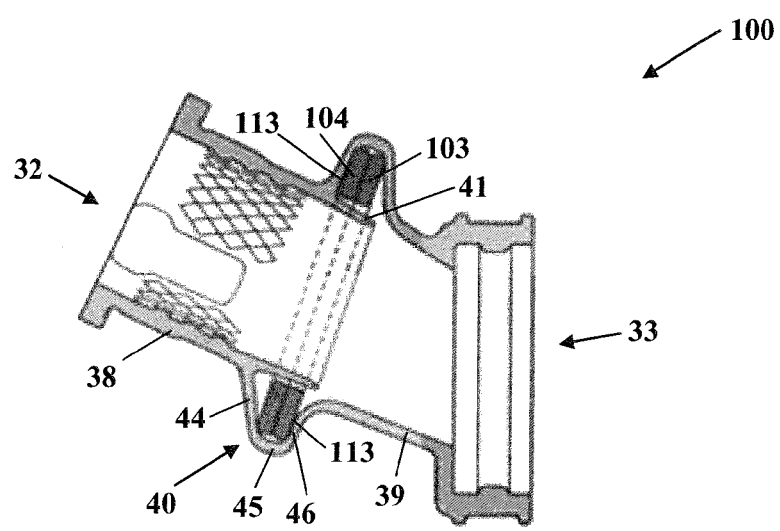
FIG. 13 shows a section through an exemplary embodiment of a connecting piece in an unloaded state; and, FIG. 14 is a schematic showing the connecting piece interconnecting the handle unit and the motor unit.

FIG. 13 shows an exemplary embodiment of a connecting piece 100 which substantially corresponds to the connecting piece 30. Here, identical reference signs denote elements corresponding to one another. Instead of the disc 43, two discs (103, 104) are arranged in the expansion fold 40 of the connecting piece 100. Here, the total thickness of the two discs (103, 104) is advantageously greater than the thickness (p) of the disc 43 (FIG. 7). The discs (103, 104) form stops 113 for the side walls 44 and 46 of the expansion fold 40. As a result, when the expansion fold 100 is compressed, only small amounts of fuel can pass into the intake channel 20. The difference between the volume enclosed by the expansion fold 40 when the connecting piece 100 is unloaded and the residual volume delimited by the expansion fold 40 when the connecting piece 100 is completely compressed is small.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
   at least one work tool;
   a combustion engine configured to drive said work tool;
   an air filter;
   an intake channel;
   said combustion engine being further configured to via said air filter draw in combustion air through said intake channel in a flow direction;
   an elastic connecting piece forming a portion of said intake channel and having a first section, a second section and an expansion fold arranged between said first section and said second section;
   said expansion fold having a first side wall and a second side wall and being configured to enable relative movements of said first and said second sections with respect to each other;
   said first side wall being arranged in said intake channel upstream of said second side wall with respect to said flow direction;

said expansion fold defining a greatest outer diameter (a);

said expansion fold further having a peripheral wall arranged between said first and said second side wall and interconnecting said first and said second side wall in said flow direction;

said peripheral wall extending in a region in which said expansion fold has said greatest outer diameter (a);

said first side wall having a segment adjoining said peripheral wall;

a stop configured for said expansion fold to prevent said segment of said first side wall from bearing against said second side wall;

said expansion fold being configured to enclose a residual volume at said peripheral wall in every position of said first section relative to said second section;

said expansion fold being configured to enclose a first volume when said connecting piece is not under load; and, said residual volume being at least 50% of said first volume.

2. The handheld work apparatus of claim 1, wherein:
said first side wall has a width (d); and,
said segment of said first side wall has an annular-shaped section extending over at least 30% of said width (d).

3. The work apparatus of claim 1, wherein:
said connecting piece has an inner diameter (f) in said first section directly upstream of said expansion fold; and,
said greatest outer diameter (a) is at least approximately 175% of said inner diameter (f).

4. The work apparatus of claim 1, wherein:
said expansion fold has an inner radius (h) from whereat said first side wall merges with said peripheral wall and to whereat said peripheral wall merges with said second side wall; and,
said inner radius (h) is less than approximately 10% of the greatest outer diameter (a) of the expansion fold at the peripheral wall when said connecting piece is in an unloaded state.

5. The work apparatus of claim 1, wherein said stop is configured to run continuously around said intake channel.

6. The work apparatus of claim 1, wherein at least one of said first and said second side wall has a plurality of protrusions configured to form said stop arranged thereon.

7. The work apparatus of claim 1, wherein at least one of said first and said second side wall has a thickening formed thereon to define said stop.

8. The work apparatus of claim 1, wherein at least one of said first and said second side wall has an irregular course configured to form said stop.

9. The work apparatus of claim 1, wherein said stop is arranged on said first side wall of said expansion fold.

10. The work apparatus of claim 1, wherein said connecting piece has a lip configured to cover said expansion fold toward said intake channel when said connecting piece is in a fully compressed state.

11. The work apparatus of claim 10, wherein:
said lip has a first end facing away from said intake channel; and,
said stop is arranged radially outside of said first end of said lip.

12. The work apparatus of claim 1 further comprising:
a motor unit including said combustion engine;
at least one anti-vibration element;
a handle unit connected to said motor unit via said at least one anti-vibration element; and, said connecting piece having a first end connected to said handle unit and a second end connected to said motor unit.

13. The work apparatus of claim 1, wherein:
said connecting piece has an inner diameter (f) in said first section directly upstream of said expansion fold; and,
said greatest outer diameter (a) is at least approximately 185%, of said inner diameter (f).

14. A handheld work apparatus comprising:
at least one work tool;
a combustion engine configured to drive said work tool;
an air filter;
an intake channel;
said combustion engine being further configured to via said air filter draw in combustion air through said intake channel in a flow direction;
an elastic connecting piece forming a portion of said intake channel and having a first section, a second section and an expansion fold arranged between said first section and said second section;
said expansion fold having a first side wall and a second side wall and being configured to enable relative movements of said first and said second sections with respect to each other;
said first side wall being arranged in said intake channel upstream of said second side wall with respect to said flow direction;
said expansion fold defining a greatest outer diameter (a);
said expansion fold further having a peripheral wall arranged between said first and said second side wall and interconnecting said first and said second side wall in said flow direction;
said peripheral wall extending in a region in which said expansion fold has said greatest outer diameter (a);
said first side wall having a segment adjoining said peripheral wall;
a stop configured for said expansion fold to prevent said segment of said first side wall from bearing against said second side wall; and,
a separate component inserted into said expansion fold to define said stop.

15. The work apparatus of claim 14, wherein:
said separate component is a disc having an outer wall; and,
said outer wall is at a distance (i) of less than approximately 2.5 mm to said peripheral wall.

16. An elastic connecting piece for a handheld work apparatus; the elastic connecting piece comprising:
a first section;
a second section;
an expansion fold arranged between said first section and said second section and configured to enable relative movement between said first section and said second section;
said expansion fold having a first side wall, a second side wall and a peripheral wall arranged between said first side wall and said second side wall;
said peripheral wall interconnecting said first side wall and said second side wall;
said expansion fold defining a greatest outer diameter (a);
said peripheral wall extending in a region of said greatest outer diameter (a);
said first side wall having a segment adjoining said peripheral wall;
a stop for said expansion fold configured to prevent said segment of said peripheral wall from bearing against said second side wall;

said expansion fold being configured to enclose a residual volume at said peripheral wall in every position of said first section relative to said second section;

said expansion fold being configured to enclose a first volume when said connecting piece is not under load; and, said residual volume being at least 50% of said first volume.

* * * * *